United States Patent [19]

Laymon et al.

[11] 4,040,044
[45] Aug. 2, 1977

[54] DUAL LINE ELECTRET TRANSDUCER

[75] Inventors: Marvin D. Laymon, Milpitas; G. Kirby Miller, Saratoga, both of Calif.

[73] Assignee: GTE Sylvania Incorporated, Mountain View, Calif.

[21] Appl. No.: 718,845

[22] Filed: Aug. 30, 1976

[51] Int. Cl.² ............................................. G08B 13/07
[52] U.S. Cl. .............................. 340/261; 340/258 R
[58] Field of Search .......................... 340/258 R, 261

[56] References Cited

U.S. PATENT DOCUMENTS

| 3,763,483 | 10/1973 | Burney et al. | 340/258 R |
| 3,833,897 | 9/1974 | Bell et al. | 340/258 R |
| 3,836,899 | 9/1974 | Duvall et al. | 340/258 R |

Primary Examiner—Glen R. Swann, III

Attorney, Agent, or Firm—John F. Lawler

[57] ABSTRACT

An improved low-cost line transducer comprises a pair of electret covered conductors twisted about each other to form longitudinal helices and mechanically coupled to a medium that transmits mechanical forces transversely of the conductors. A change in the conductor-electret spacing caused by the mechanical disturbance generates an electrical signal between the conductors which is detected and processed by appropriate circuitry for indicating the occurrence of the disturbance. This simplified line transducer has improved sensitivity to the low frequency disturbances because of the non-symmetrical relation of the two conductors throughout their length. Undesired hum and noise picked up by the unshielded line is reduced or eliminated by appropriate circuits in the signal processor.

3 Claims, 5 Drawing Figures 4,040,044

DUAL LINE ELECTRET TRANSDUCER

BACKGROUND OF THE INVENTION

This invention relates to line transducers and more particularly to an improved electret line transducer. One application of the invention is in an intrusion detection system.

The coaxial cable transducer described in U.S. Pat. No. 3,763,482 has been used successfully to detect mechanical disturbances over a fairly wide range of frequencies, for example, from 1 Hz to 10 KHz. An example of an application in which disturbances in this frequency range are efficiently detected by the coaxial cable transducer is a chain link fence to which the transducer is tightly secured by ties as described in the foregoing patent. The sensitivity of the coaxial cable transducer, however, diminishes at lower frequencies such as 0.1 Hz - 0.5 Hz because of the cylindrical shape of the outer conductor. When the outer conductor is exposed to each low-frequency unidirectional compression, the spacing between the outer conductor and the outer surface of the electret filler decreases at some locations but increases at others so as to have a net signal cancellation effect. This results in a reduced sensitivity of the transducer.

Another consideration of the coaxial cable configuration is its relatively high cost compared to twin line cable, the latter being about ½ to ⅓ of the cost of the coaxial cable. It would be advantageous, therefore, from a cost standpoint to utilize a twin lead cable as a substitute for the coaxial cable in line transducer applications.

OBJECTS AND SUMMARY OF THE INVENTION

A general object of the invention is the provision of a line transducer having improved sensitivity at low frequencies as compared to a coaxial line transducer.

Another object is the provision of a low-cost effecient line transducer that is easy to install and maintain.

These and other objects of the invention are achieved with a transducer made of unshielded twin electret-covered conductor lines which are helically wound or twisted in a longitudinal direction. This cable configuration provides continuous non-symmetrical deposition of one line relative to the other so that even very low frequency unidirectional forces coupled to the line produce readily detectable electrical signals across the conductors. Stray undesirable signals picked up by the unshielded cable are cancelled in processor circuits to which the conductors are connected.

DESCRIPTION OF PREFERRED EMBODIMENT

Figure 1:
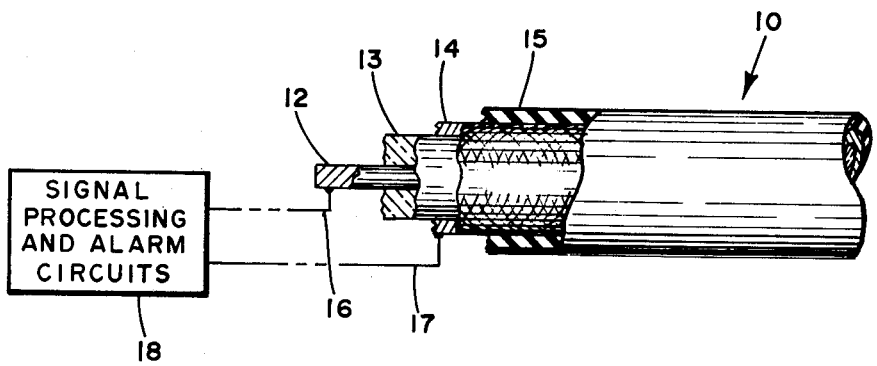
FIG. 1 is a portion of a partially cut-away coaxial cable transducer of the prior art.

In order to provide a better understanding of the invention, an analysis of the operation of the coaxial cable transducer described in Pat. No. 3,763,482 at very low frequencies will first be given. Referring now to the drawings, FIG. 1 illustrates the construction of a coaxial cable transducer 10 comprising inner conductor 12, dielectric 13 which is electrostatically charged and preferably is an electret, outer conductor 14 surrounding the dielectric 13, and an insulator jacket 15 enclosing the outer conductor. Inner conductor 12 and outer conductor 14 are connected by lines 16 and 17, respectively, to signal processing and alarm circuits 18 at a remote location. The cable is mechanically coupled to the desired medium under surveillance, such as connection to a chain link fence or burial in the ground, so that mechanical disturbances induced in the medium are transmitted to the exterior of the cable and generate corresponding electrical signals on lines 16 and 17 for transmission to and processing by circuits 18.

Figure 2:
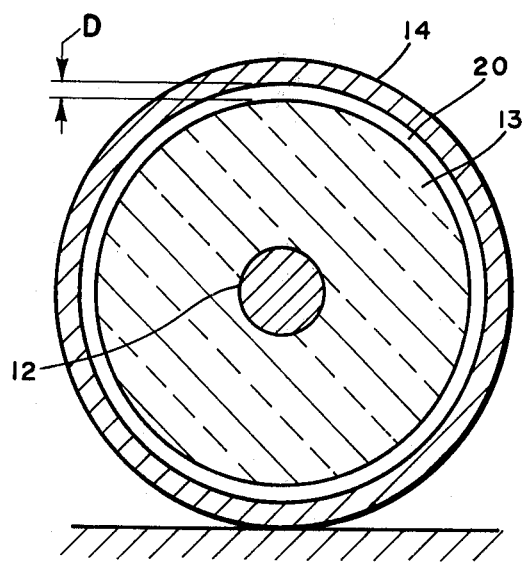
FIGS. 2 and 3 are greatly enlarged schematic transverse sections of unstressed and stressed prior art coaxial cables, respectively, illustrating the principle of operation with low frequency disturbances.
Figure 3:
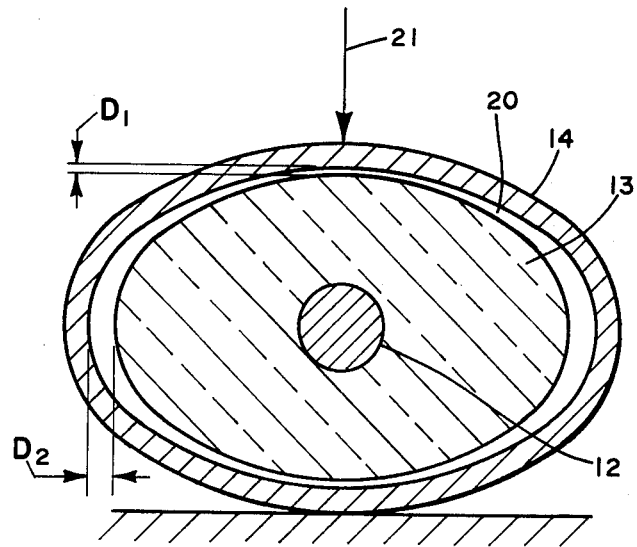

FIGS. 2 and 3 illustrate schematically the air gap spacing 20 between outer conductor 14 and the outer surface of dielectric 13, the dimensions of this spacing being greatly exaggerated for clarity of explanation. The width of spacing 20 indicated as D in the unstressed cable in FIG. 2 is substantially the same around the cable circumference. When the cable is subjected to a low frequency pressure wave, for example, in order of 0.1 to 0.5 Hz, the unidirectional force indicated by the arrow 21 in FIG. 3 causes outer conductor 14 to become unevenly spaced from dielectric 13 around the circumference of the cable; that is, spacing 20 is not uniform around the cable circumference. For example, the width $D_1$ of spacing 20 at the point of application of force 21 is smaller than its original width D while the corresponding width $D_2$ at the sides of the cable is larger than D. Since the magnitude of the signal generated by the coaxial cable is determined by the amount and direction of displacement of outer conductor 14 relative to the outer charged surface of dielectric 13, the simultaneous decrease of width of spacing 20 tends to have a cancellation effect on the magnitude of the output signal. The sensitivity of the coaxial cable transducer to such low frequency disturbances is therefore substantially reduced.

Figure 4:
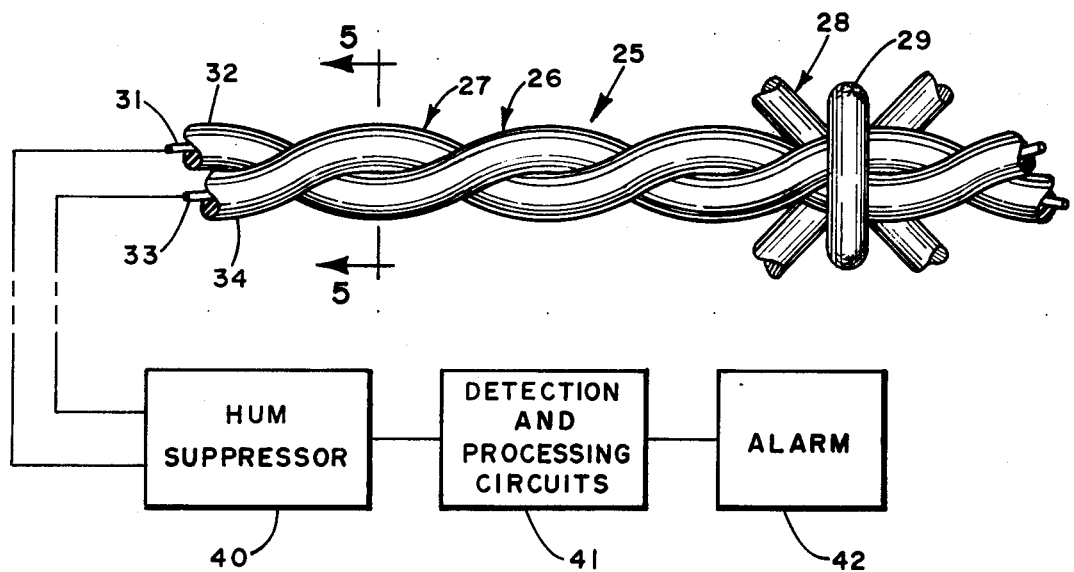
FIG. 4 is an elevation of a line transducer system embodying this invention.

In accordance with this invention, the foregoing disadvantage of the coaxial cable transducer is overcome with a cable 25 comprising two substantially identical contiguous lines 26 and 27, see FIG. 4, which are twisted in a longitudinal direction throughout their length. In a preferred embodiment, each of the lines is twisted about the other in the form of a helix. This cable, known as "a twisted line pair" or "a twisted pair", is directly coupled to a medium to be monitored which may, for example, be a chain link fence 28 to which the cable is coupled by a tie 29. The cable may alternatively comprise a pair of juxtaposed lines that are secured together, the pair being twisted as a unit in a longitudinal direction.

Line 26 consists of a wire-like conductor 31 and a dielectric jacket 32 surrounding the conductor; similarly, line 27 has a conductor 33 insulated by an enclosing dielectric jacket 34. Jackets 32 and 34 are electrostatically charged so as to constitute an electret; this may be achieved, for example, as described in the foregoing patent for coaxial cable, by applying a high unidirectional voltage across conductors 31 and 33 of the twisted lines while the jackets are heated, and maintaining this electrical stress as the dielectric material cools.

Figure 5:
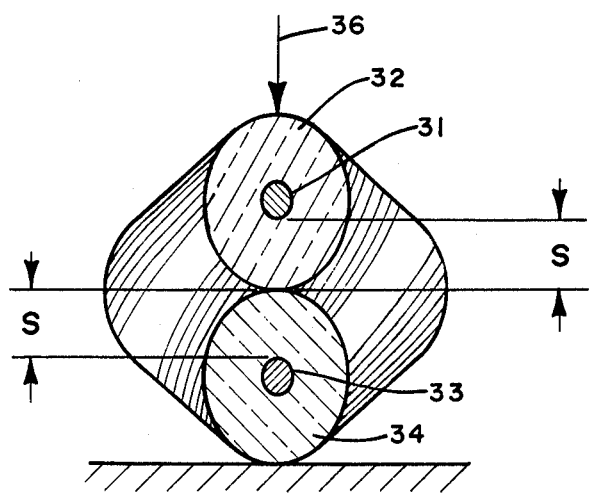
FIG. 5 is an enlarged transverse section taken on line 5—5 of FIG. 4.

The application of an external unidirectional force 36, see FIG. 5, to the cable decreases the distance S between conductors 31 and 33 and the exteriors of the jackets 34 and 32, respectively, and produces an electric signal across these conductors with no signal cancellation effect. The asymmetrical cross-sectional shape of the twisted pair cable 25 thus insures uniform sensitivity of the transducer to very low frequency pressure-wave type disturbances.

Cable 25 is unshielded and accordingly is exposed to and may pick up stray electric fields which produce hum and/or noise along with the desired signal resulting from mechanical excitation. These undesired signals may be suppressed or essentially eliminated in suitable electrical circuits attached to the conductors and indicated at 40 in FIG. 4. An example of a hum suppressor is a differential charge amplifier. Alternatively, an electronic filter may be used to eliminate noise that is not in the signal band of interest. For example, if the application does not require sensitivity in the 60 Hz range, a low pass filter with a 40 Hz cutoff may be used to eliminate the 60 Hz hum from the signal; or a 60 Hz notch filter may be used. The output from hum suppressor 40 is connected to detection and processing circuits 41 and an alarm 42.

The twisted line pair transducer of this invention provide uniform sensitivity to disturbances over a wide frequency band including pressure wave-type disturbances having very low frequencies. In addition, this line transducer is a low cost sensor because of its relatively simple structural configuration and yet it is durable, easy to install and convenient to maintain.

What is claimed is:

1. A system for detecting mechanical disturbances in a medium comprising a pair of coextensive contiguous lines twisted in a longitudinal direction and in physical contact with said medium whereby disturbances in said medium are directly coupled to said lines, each of said lines comprising an elongated conductor and a dielectric jacket enclosing said conductor, at least one of said jackets constituting an electret whereby a disturbance in said medium changes the spacing between said one of said jackets and the conductor enclosed by the other jacket to produce an electrical signal across said conductors, and utilization apparatus connected to said conductors and responsive to said signal.

2. The transducer according to claim 1 in which both of said jackets comprise electrets.

3. The transducer according to claim 1 in which each of said lines is twisted about the other to form a longitudinally extending helix.

* * * * *